3,248,240
/ LINING OF A CONVERTER
Russell Pearce Heuer, Villanova, Pa., assignor to General
Refractories Company, a corporation of Pennsylvania
No Drawing. Filed Dec. 24, 1964, Ser. No. 421,067
2 Claims. (Cl. 106—60)

This application is a continuation-in-part of my copending application Serial No. 153,205, filed November 17, 1961, for Lining of a Converter, now abandoned, the latter application being a continuation-in-part upon my now abandoned application Serial No. 151,151, filed November 9, 1961, for Lining of a Converter, and the present invention relates to a refractory brick comprising magnesia and intended for use in furnaces for making steel from pig iron by blowing oxygen gas or gaseous mixtures containing oxygen, as for example, the basic Bessemer converter, L.D. converter, Kaldo converter, etc.

A purpose of the present invention is to make available for the lining of such furnaces a brick which is prepared from a mixture of refractory calcined magnesias wherein mineralogical constituents, initialy present in the respective magnesias, and brought together through mixing the magnesias, are reactive with each other under heat to form compounds which enhance the refractoriness of the brick.

A further purpose is to use as an ingredient in such a brick a calcined magnesia of a specific analysis (Type I) and capable of forming when calcined to approximate equilibrium conditions a mineral phase of dicalcium ferrite in excess of 7% by weight. The magnesia should contain an excessive amount of lime, i.e., above 4% or preferably 5% and not exceeding 20% by weight, together with ion oxide ($Fe_2O_3$) in excess of 4% and not exceeding 15% by weight, and permissibly alumina plus manganese oxide about 1% by weight, so that the magnesia content is less than 90% but not less than about 65% by weight, and despite this, containing necessarily a very low content of silica by weight, namely, between 0.05% and 2%, or between 0.05% and 3% if the magnesia content is less than 80% by weight.

A further purpose is to mix the aforesaid magnesia refractory with between 10 and 75% of another calcined magnesia refractory (Type II) containing magnesia, at least 75%; high in silica, i.e., containing silica between 3% and 15% by weight but necessarily low in lime, i.e., between 0.3% and 3% by weight.

A further purpose is to self-beneficiate magnesia by causing a mixture of different magnesias to react to develop better refractory properties.

A further purpose is to convert different mineralogical constituents of different magnesias by reacting these constituents in a mixture of the magnesias and thus improve the properties of the refractory as a whole.

A further purpose is to press a mixture of different magnesias to brick form under pressure exceeding 5000 p.s.i. and thereafter react with each other different mineralogical constituents of the different magnesias intimately brought together by the pressing, to improve the refractory properties of the brick and achieve a bond from the reaction.

A further purpose is to mix the aforesaid refractory composition having the different magnesias therein with pitch at a temperature above room temperature, and to press the hot mixture to brick form under pressure exceeding 5000 p.s.i.

A further purpose is to moisten the aforesaid magnesia mixtures with a chemical bonding agent instead of pitch, such as a solution of sulfuric acid, magnesium chloride, magnesium sulfate, chromic acid, sodium silicate, sulfite pitch, or other organic bonding agents, and form the brick under high pressure between 5000 and 15000 p.s.i., preferably exceeding 8000 p.s.i.

The present practice of lining oxygen furnaces such as the L.D. converter, involves the use of a brick made from calcined dolomite, or a mixture of calcined dolomite with calcined magnesia, or calcined magnesia bonded with pitch or tar. Recent improvements seem to depart from the original use of calcined dolomite and to use linings containing calcined magnesia and having about 70% MgO, especially if the capacity of the vessel exceeds 50 tons. The calcined refractory is crushed, ground and screened to suitable particle size comprising coarse and fine grains which are mixed with about 6% to 7% by weight of pitch melting at about 75–95° C., and heated to approximately 115° C. to facilitate mixing.

The mixture is then molded and pressed into brick form at pressures of 5000 p.s.i. or more. The bricks, upon cooling, develop a bond due to the hardening of the pitch. They are then suitable for use in the converter. In service, the tar is found to burn out at the hot operating face of the brick. In the interior sections of the brick the temperature of the vessel converts the pitch into a coke which acts as a bond for the refractory. The strength of the coked tar bond leaves much to be desired and it is the purpose of this invention to develop a ceramic bond in the magnesia refractory to supplement the tar bond. The invention also contemplates self-beneficiating the mixture of calcined magnesias.

In the present invention a calcined magnesia, hereinafter referred to as Type I is used, having a composition wherein MgO by weight is less than 90% and not less than 65%, and preferably with lime between 4% and 20% by weight and iron oxide between 4% and 15% by weight, but with silica between 0.05% and 2% by weight, so that the composition contains in excess of 7% by weight of dicalcium ferrite. Such magnesia can be prepared by calcining in a rotary kiln natural magnesite of the desired composition which may or may not have been beneficiated, or calcining in a rotary kiln according to my U.S. Patent No. 2,447,412, magnesium hydrate prepared from brine or seawater adjusted to the desired chemical composition. Such a calcine has a lime-silica ratio of more than 2. For this reason there is present in the calcine a crystalline phase of dicalcium silicate ($C_2S$), and lime combined with iron oxide to form dicalcium ferrite ($C_2F$). If an amount of lime in excess of that capable of forming $C_2F$ is present, it must be kept to a minimum if aqueous solutions of bonding agents instead of pitch are used to bond the brick because of the tendency of the free lime to slake.

A suitable Type I calcined magnesia has the following typical composition by weight:

| | Percent |
|---|---|
| Ignition loss | 0.28 |
| $SiO_2$ | 0.80 |
| $Fe_2O_3$ | 5.90 |
| $Al_2O_3$ | 0.62 |
| CaO | 6.30 |
| MgO | 86.10 |

To this Type I magnesia I add from 10 to 75% by weight of a calcined bonding magnesia, hereinafter referred to as Type II, containing in excess of 75% magnesia by weight; containing silica between 3 and 15% by weight; and lime relatively low, i.e., between 0.3% and 3% by weight and having a molar ratio of CaO to $SiO_2$ of 1 or less. A typical analysis is the following by weight:

| | Percent |
|---|---|
| Ignition loss | 0.30 |
| $SiO_2$ | 9.70 |
| $Fe_2O_3$ | 0.25 |
| $Al_2O_3$ | 0.23 |
| CaO | 3.19 |
| MgO | 86.33 |

Such a bonding magnesia will contain at least one mineralogical constituent of the group consisting of monticellite (CMS) and fosterite ($M_2S$). The silica in these compounds will react when heated with the $C_2F$ in the Type I magnesia and form merwinite ($C_3MS_2$) or dicalcium silicate ($C_2S$). The iron oxide thus liberated will combine with magnesia, forming magnesium ferrite MF. The formation of these new compounds in situ acts to bond the refractory. The new products in situ are appreciably more refractory than the $C_2F$ and CMS present in the respective original magnesias. The following reactions are applicable:

(1) $4CMS + C_2F \rightarrow 2C_3MS_2 + M + MF$ (2) $2CMS + C_2F \rightarrow 2C_2S + M + MF$ (3) $4M_2S + 3C_2F \rightarrow 2C_3MS_2 + 3M + MF$ (4) $M_2S + C_2F \rightarrow C_2S + M + MF$ The mixture of the two magnesias is formed to have an MgO content of less than 90% by weight, and the dicalcium ferrite occurs as a mineralogical constituent of the Type I magnesia while either or both the monticellite and fosterite occur as mineralogical constituents of the Type II magnesia. Reaction of the dicalcium ferrite with the mineralogical constituent of the Type II magnesia allows periclase to remain predominately as a refractory substance from both of the mixed magnesias, and the reaction forms merwinite, dicalcium silicate, magnesia, and magnesia ferrite from the mineralogical constituents from the periclase in the respective magnesias in favor of producing compounds which are more refractory than the dicalcium ferrite and the monticellite.

The reaction products (magnesia, M, magnesium ferrite, MF, dicalcium silicate, $C_2S$, and tricalcium magnesium silicate, $C_3MS_2$) form a refractory bond for the calcined magnesias. It is evident that the different compounds of silica initially present (CMS or $M_2S$) yield different amounts of the reaction products even though the amount of silica in the initial products is kept constant. Thus, the analysis of the initial magnesias chosen for the mixture will influence the amount of bond even though the amount of lime and silica in the end product is kept constant.

I desire that the mixture of the two calcined magnesias contain lime and silica in a weight ratio between about 1.5 and 2.0 and necessarily between the limits of 1.3 and 3.5.

A mixture of 70 parts by weight of the Type I magnesia and 30 parts of Type II bonding magnesia would accomplish this objective. The mixture analyzes as follows by weight:

| | Percent |
|---|---|
| Ignition loss | 0.30 |
| $SiO_2$ | 3.47 |
| $Fe_2O_3$ | 4.21 |
| $Al_2O_3$ | 0.50 |
| CaO | 5.37 |
| MgO | 86.15 |

Another mixture of 80 parts by weight of Type I magnesia and 20 parts of Type II magnesia is suitable. It analyzes by weight:

| | Percent |
|---|---|
| Ignition loss | 0.28 |
| $SiO_2$ | 2.58 |
| $Fe_2O_3$ | 4.78 |
| $Al_2O_3$ | 0.55 |
| CaO | 5.68 |
| MgO | 86.13 |

In order to make brick from these magnesia mixtures, I select particles having a size to pass through 4 or 6 mesh and rest on 28 mesh, and particles to pass through 65 or 100 mesh or finer. I take from 50 to 70 parts by weight of the coarser particles, 30 to 50 parts of the finer particles, mix them thoroughly with pitch having a melting point of 75° to 95° C. and preferably about 90° C., maintain the mixture at 115° C. and press it into brick form at pressures exceeding 5000 p.s.i. Upon cooling, the brick obtain a bond and are suitable for use.

If desired, I may omit the pitch from the mixture which is formed into brick and temper the mixture with water containing a bonding substance to make the brick suitable for use without kiln firing. Such bonds might consist of dilute sulfuric acid, magnesium chloride, magnesium sulfate, chromic acid, sodium silicate, sulfite pitch, or other organic agents.

The brick may also be burned in a kiln prior to use.

Where I define the amount of calcium ferrite, $C_2F$ present in calcined Type I magnesia, this amount is determined by first calculating the amount of lime required to unite with the silica present to form $C_2S$ and subtracting this from the total lime present to find the amount of lime in excess. This excess is then assumed to combine with iron oxide to form $C_2F$. Any small amount of alumina (A) present will form $C_4AF$, tetra calcium aluminum ferrite, but I will consider this as included in the calculated amount of $C_2F$.

Although primarily designed for oxygen converters, my brick may also be used in places where tar bonded dolomite or dolomitic magnesite brick find use as for example, large blocks for the walls of electric arc furnaces.

Mesh referred to are Tyler Standard Mesh per linear inch.

Where I refer to calcined magnesia for the manufacture of refractory bonded with a chemical bonding agent, I prefer the calcined grains to have a bulk specific gravity between about 3.05 to 3.40. Where I refer to calcined magnesia for refractory bonded with tar, it may be advantageous to use grains of lower bulk specific gravity, i.e., about 2.9 to 3.1. Such grains are more porous and they absorb the tar and produce a better coke bond.

In view of my invention and disclosure, variations and modifications to meet individaul whim or particular need will doubtless become evident to others skilled in the art to obtain all or part of the benefits of my invention without copying the product and process shown, and I, therefore, claim all such insofar as they fall within the resonable spirit and scope of my claims.

Having thus described my invention what I claim as new and desire to secure by Letters Patent is:

1. An unfired basic refractory brick for lining a converter which produces steel from molten pig iron by the action of gas containing oxygen, which consists essentially of a mixture of first and second calcined magnesias, (a) Said first calcined magnesia having the following composition by weight:

Magnesia _____ 65 to less than 90%.
  Lime _____ 4 to 20%.
  Iron oxide _____ 4 to 15%.

Silica content related to magnesia content as follows:

| Magnesia | Silica |
|---|---|
| 80 to 89%. | 0.05 to 2%. |
| 65 to less than 80%. | 0.05 to 3%. |
| Dicalcium ferrite at equilibrium more than 7%. | |

(b) Said second calcined magnesia having a composition as follows by weight:
- Magnesia _____ In excess of 75%.
- Silica _____ 3 to 15%.
- Lime _____ 0.3 to 3%.

(c) Said second magnesia containing at least one mineralogical constituent of the group consisting of monticellite and forsterite which react upon firing with dicalcium ferrite of said first magnesia to render the brick more refractory by forming merwinite, dicalcium silicate, magnesia and magnesium ferrite, and (d) Said mixture of said first and second magnesias having less than 90% MgO by weight, and being in proportions which establish a lime-silica ratio in the mixture between 1.3 and 3.5.

2. A method of molding a basic refractory brick for lining a converter which produces steel from molten pig iron by the action of gas containing oxygen, which comprises mixing together:

(a) A first calcined magnesia having the following composition by weight:

| | Percent |
|---|---|
| Magnesia | 65 to 89 |
| Lime | 4 to 20 |
| Iron oxide | 5 to 15 |

Silica content related to the magnesia content as follows:

| Magnesia | Silica |
|---|---|
| 80 to 89%. | 0.05 to 2%. |
| 65 to less than 80%. | 0.05 to 3%. |
| Dicalcium ferrite at equilibrium more than 7%. | |

(b) With sufficient of a second calcined magnesia to make the lime silica ratio of the mixture between 1.3 and 3.0, said second magnesia having the following composition by weight:
- Magnesia _____ In excess of 75%.
- Silica _____ 4 to 15%.
- Lime _____ 0.3 to 3%.

Contains monticellite and forsterite, (c) molding the brick under a pressure exceeding 5000 p.s.i.

(d) and subjecting said brick to a temperature sufficient to cause said mineralogical constituent of the second magnesia to react with dicalcium ferrite of the first magnesia and increase the refractoriness of the brick as a whole by forming merwinite, dicalcium silicate, magnesia and magnesium ferrite.

References Cited by the Examiner

UNITED STATES PATENTS

| 2,291,918 | 8/1942 | Pitt et al. | 106—60 |
| 2,621,131 | 12/1952 | Lathe | 106—60 |

TOBIAS E. LEVOW, *Primary Examiner.*